(12) United States Patent
Yang et al.

(10) Patent No.: US 10,680,930 B2
(45) Date of Patent: Jun. 9, 2020

(54) METHOD AND APPARATUS FOR COMMUNICATION IN VIRTUAL NETWORK

(71) Applicant: BEIJING BAIDU NETCOM SCIENCE AND TECHNOLOGY CO., LTD., Beijing (CN)

(72) Inventors: Yi Yang, Beijing (CN); Ying Wang, Beijing (CN); Tao Peng, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 15/534,395

(22) PCT Filed: Nov. 26, 2015

(86) PCT No.: PCT/CN2015/095637
§ 371 (c)(1),
(2) Date: Jun. 8, 2017

(87) PCT Pub. No.: WO2017/028391
PCT Pub. Date: Feb. 23, 2017

(65) Prior Publication Data
US 2018/0262418 A1 Sep. 13, 2018

(30) Foreign Application Priority Data
Aug. 19, 2015 (CN) .......................... 2015 1 0511696

(51) Int. Cl.
*H04L 12/755* (2013.01)
*H04L 12/741* (2013.01)
(Continued)

(52) U.S. Cl.
CPC ........ *H04L 45/021* (2013.01); *G06F 9/45558* (2013.01); *H04L 45/28* (2013.01);
(Continued)

(58) Field of Classification Search
CPC ... H04L 63/1425; H04L 45/021; H04L 45/28; H04L 45/54; H04L 45/745; H04L 61/103; H04L 45/74; G06F 9/45558
See application file for complete search history.

(56) References Cited

U.S. PATENT DOCUMENTS

| 9,565,104 B2 * | 2/2017 | Zhang | H04L 45/74 |
| 9,762,502 B1 * | 9/2017 | Mogul | H04L 47/32 |
| 2013/0223444 A1 * | 8/2013 | Liljenstolpe | H04L 61/103 370/392 |

FOREIGN PATENT DOCUMENTS

| CN | 102325079 A | 1/2012 |
| CN | 102685006 A | 9/2012 |
| (Continued) | | |

OTHER PUBLICATIONS

International Search Report w/English translation, dated May 19, 2016, for PCT/CN2015/095637, 5 pages.

*Primary Examiner* — Vinncelas Louis
(74) *Attorney, Agent, or Firm* — Seed IP Law Group LLP

(57) ABSTRACT

The present application discloses a method and apparatus for establishing a virtual network communication link. A specific implementation of the method includes: determining no flow table being detected; and determining sending of a data packet according to information about the data packet. This implementation implements automatic flow table repair, ensures an SLA for a virtual network communication link, and improves the disaster tolerance capability of the communication link.

13 Claims, 4 Drawing Sheets

(51) Int. Cl.
*G06F 9/455* (2018.01)
*H04L 29/06* (2006.01)
*H04L 12/703* (2013.01)

(52) U.S. Cl.
CPC ............ *H04L 45/54* (2013.01); *H04L 45/745* (2013.01); *H04L 63/1425* (2013.01); *G06F 2009/45595* (2013.01); *H04L 63/1466* (2013.01)

(56) References Cited

FOREIGN PATENT DOCUMENTS

| | | |
|---|---|---|
| CN | 104283785 A | 1/2015 |
| CN | 105141526 A | 12/2015 |
| JP | 2014-160992 A | 9/2014 |

\* cited by examiner

METHOD AND APPARATUS FOR COMMUNICATION IN VIRTUAL NETWORK

CROSS-REFERENCE TO RELATED APPLICATION

This application is related to and claims priority from Chinese Application No. 201510511696.9, filed on Aug. 19, 2015, entitled "Method and Apparatus for Communication in Virtual Network" in the name of Beijing Baidu Netcom Science And Technology Co., Ltd., the entire disclosure of which is hereby incorporated by reference.

TECHNICAL FIELD

The present application relates to the field of communication, and specifically to the field of communication link establishment technology.

BACKGROUND

OpenStack is an open-source project initiative for providing software for the creation and management of public and private clouds, and includes storage, mirroring, network and other components. Neutron is the core component in OpenStack for managing virtual networks.

In current Neutron implementations, a virtual network communication link is established by means of cooperation between Neutron components and configured in advance after creation. After a creation request is sent to nova-api, the creation request is first scheduled to a computing node according to resource requirements, and then nova-compute on the computing node creates a virtual machine instance and a virtual network device according to the received request. After the virtual network device is created, Neutron can automatically detect the created virtual network device, and then establish a virtual network link according to information such as an information configuration dhcp and security group of the virtual network device.

According to current Neutron implementation methods, in a complete creation process for a virtual machine, a Neutron server needs to notify each agent of the change of the network state. However, the current Neutron implementation methods rely heavily on message queues, causing a great burden to the database; and lack a retry mechanism for the above-mentioned notification, failing to automatically repair the virtual network in the case of message loss or network interruption, and leading to the problem that the virtual machine cannot acquire the IP address or access an external network.

Therefore, to ensure a Service-Level Agreement (SLA), it is necessary to further the research on virtual network communications having an automatic repair function.

SUMMARY

The present application provides a method and apparatus for communication in a virtual network, in order to solve the problem mentioned above.

A first aspect of the present application provides a method for communication in a virtual network. The method comprises: determining no flow table being detected; and determining sending of a data packet according to information about a data packet.

In an embodiment of the first aspect, the information about the data packet is a destination IP address of the data packet.

In an embodiment of the first aspect, when the destination IP address of the data packet and a switch are located in a same network, the information about the data packet is sent to a controller.

In an embodiment of the first aspect, when the destination IP address of the data packet and a switch are not located in a same network, a flow table used for sending the data packet to a gateway is provided.

In an embodiment of the first aspect, the method further comprises: determining whether the destination IP address of the data packet and the switch are located in the same network by determining whether the destination IP address of the data packet is located in classless inter-domain routing of a subnet of the switch.

In an embodiment of the first aspect, when it is determined that no virtual machine corresponding to the destination IP address of the data packet exists, a number of data packets not matching a flow table and sent to the controller is recorded.

In an embodiment of the first aspect, when it is determined that a virtual machine corresponding to the destination IP address of the data packet exists, a flow table for forwarding the data packet is provided.

In an embodiment of the first aspect, when the recorded number of data packets reaches a predetermined threshold, a flow table for barring the virtual machine from sending data is added.

In an embodiment of the first aspect, the predetermined threshold is 15 times per second.

In an embodiment of the first aspect, a flow table for barring the switch from sending data has a predetermined valid time period.

A second aspect of the present application provides a switch for communication in a virtual network. The switch comprises: a receiving module, configured to determine whether a flow table of a received data packet is detected in a local flow table of the switch; and a sending module, configured to send the data packet according to a flow table generated based on information about the data packet.

In an embodiment of the second aspect, the receiving module is further configured to determine whether a destination IP address of the data packet and the switch are located in a same network, when it is determined no flow table being detected.

In an embodiment of the second aspect, the sending module is further configured to suspend data forwarding to a virtual machine according to a flow table delivered from a controller.

A third aspect of the present application provides a controller for a virtual network. The controller comprises: a receiving module, configured to receive, from a switch, information about a data packet indicating no flow table being detected; a generation module, configured to generate a corresponding flow table according to a forwarding rule of the controller or a determining result of the switch; and a sending module, configured to deliver the flow table generated by the generation module to the switch.

In an embodiment of the third aspect, the controller further comprises a determining module, configured to determine whether a virtual machine corresponding to a destination IP address of the data packet exists and configured to perform a threshold comparison and an expiration judgment, so as to determine the forwarding rule.

In an embodiment of the third aspect, the controller further comprises a recording module, configured to record a number of data packets sent to the controller and indicating no flow table being detected, when the determining module determines that no virtual machine corresponding to the destination IP address of the data packet exists.

In an embodiment of the third aspect, the generation module is further configured to generate a flow table for barring a virtual machine from forwarding data, when the determining module determines that the recorded number of data packets not matching a flow table and sent to the controller exceeds a threshold.

In an embodiment of the third aspect, the flow table, which is generated by the generation module, for barring a virtual machine from forwarding data has a predetermined valid time period.

Compared with the prior art, the present invention has the beneficial effects of greatly reducing the dependence on message queues, optimizing the flow table structure, and more importantly, achieving automatic flow table repair, thus reducing the time required for repairing a virtual network communication link, ensuring an SLA for the virtual network communication link, and improving the disaster tolerance capability of the communication link. In addition, the present invention can be applied to various virtual network implementations where virtual machine network forwarding is implemented based on OpenFlow.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. It should be noted that the embodiments in the present application and the features in the embodiments may be combined with each other on a non-conflict basis. In addition, it should also be noted that, for the ease of description, only the parts related to the relevant invention are shown in the accompanying drawings.

Figure 1:
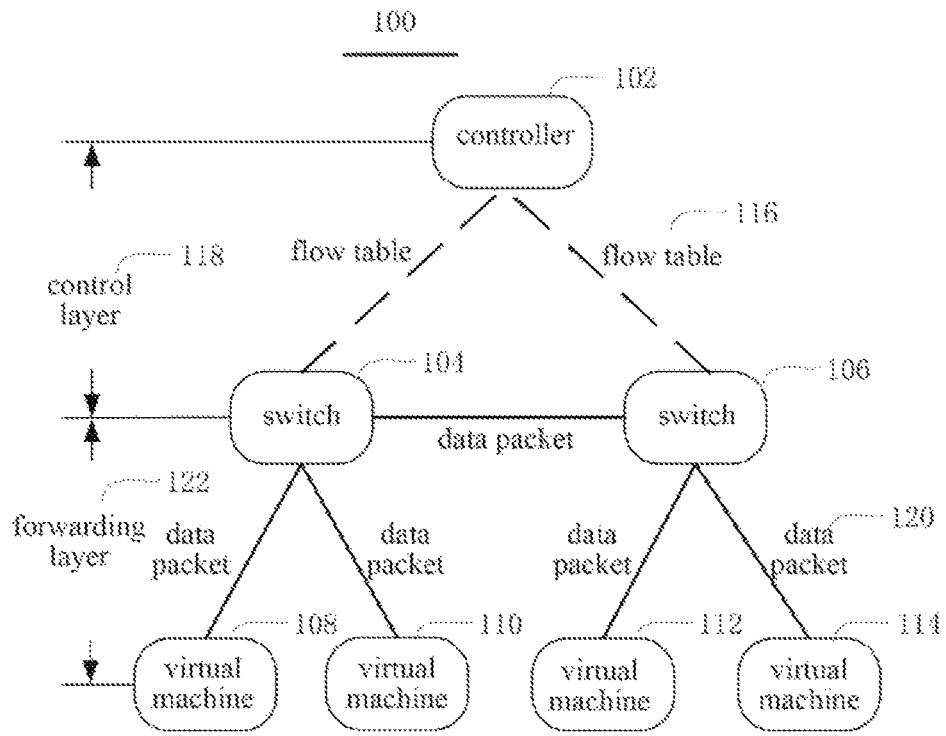
FIG. 1 is a schematic architectural diagram of a communications system according to an embodiment of the present invention.

FIG. 1 is a schematic architectural diagram of a communications system according to an embodiment of the present invention. However, it would be appreciated that, the embodiments of the present invention are not limited to the architecture shown in FIG. 1.

In this embodiment, a communications system 100 for Software Defined Networking (SDN) includes: a controller 102, for example, a control server; switches 104 and 106, for example, OpenFlow switches; and virtual machines (VMs) 108, 110, 112, and 114. The controller 102 may communicate with the switches 104 and 106 by using a flow table 116, thus forming a control layer 118 for routing management. The switch 104 communicates with the virtual machines 108 and 110, and the switch 106 communicates with the virtual machines 112 and 114, thus forming a forwarding layer 122 for forwarding a data packet 120. In addition, data may be forwarded between the switch 104 and the switch 106.

Although a particular number of switches and virtual machines are provided in this embodiment, it should be appreciated that, the controller may communicate with one or more switches, and similarly, the switch may communicate with one or more virtual machines.

The communications system provided in the above embodiment of the present invention implements the separation of data forwarding and routing control by using the switches and the controller to jointly forward packets.

Figure 2:
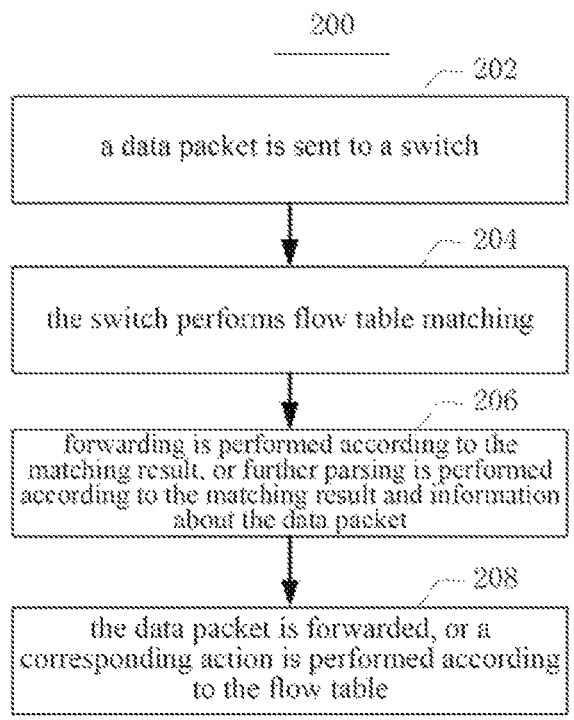
FIG. 2 is a schematic flow chart of a method for establishing a virtual network communication link.

Referring to FIG. 2, a schematic flow 200 of a method for establishing a virtual network communication link is illustrated. The method is mainly used for managing data forwarding in SDN by using a forwarding rule generated, so as to provide an effective virtual network communication link.

As can be seen from FIG. 2, the schematic flow 200 includes the following steps. At step 202, a data packet is sent to a switch. In this embodiment, the data packet is sent by at least one virtual machine connected to the switch. At step 204, the switch performs flow table matching. In this embodiment, the switch matches a flow table of the data packet received from the virtual machine with a flow table that is set therein. At step 206, forwarding is performed according to the matching result, or further parsing is performed according to the matching result and information about the data packet. At step 208, the data packet is forwarded, or a corresponding action is performed according to the flow table. In this embodiment, the corresponding action includes forwarding the data packet and barring the virtual machine from sending data.

Specifically, if the flow table matching is successful at step 204, the switch forwards the received data packet at step 206; if the flow table matching is not successful at step 204, that is, no matching flow table is detected, at step 206, the switch makes a judgment according to the information about the data packet, and sends the information about the data packet to a controller and forwards the data packet according to a flow table that is delivered by the controller after the controller further parses the data packet, or determines that the data packet is a data packet to be sent to a gateway and sends the data packet to the gateway according to a flow table of the controller.

In some optional implementations, the information about the data packet according to which the controller further parses the data packet is preferably a destination IP address of the data packet.

Figure 3:
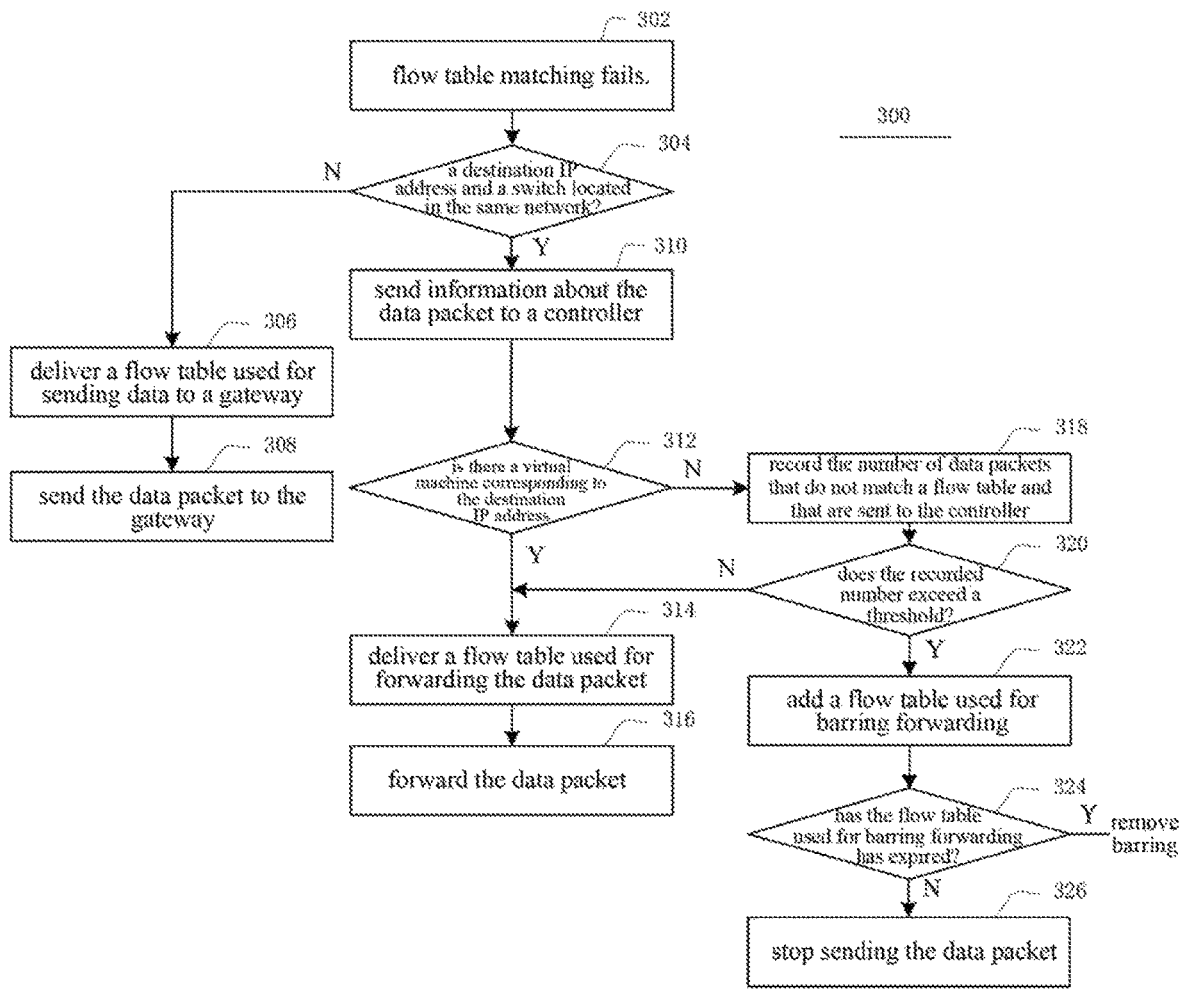
FIG. 3 is a flow chart of an embodiment of a method for communication in a virtual network in the case where flow table matching fails.

FIG. 3 is a flow chart of an embodiment of a method for communication in a virtual network in the case where flow table matching fails. The method for establishing a virtual network communication link is described below with reference to FIG. 3. In this embodiment, the flow 300 of the method specifically includes the following steps.

At step 302, a switch determines that flow table matching fails.

At step 304, the switch determines whether a destination IP address of a received data packet and the switch are located in the same network.

In some optional implementations, the switch determines whether the destination IP address of the data packet and the switch are located in the same network by checking whether the destination IP address of the data packet is located in classless inter-domain routing (CIDR) of a subnet of the switch.

If it is determined at step 304 that the destination IP address of the received data packet is not located in a same network as the switch, it is considered that the received data packet is a data packet to be sent to a gateway. The failure of flow table matching for such a data packet indicates a lack of a flow table used for sending data to the gateway. In this case, a controller needs to deliver, to the switch, a flow table used for sending data to the gateway, that is, perform step 306; then the switch sends the data packet to the gateway according to the flow table delivered by the controller, that is, performs step 308.

If it is determined at step 304 that the destination IP address of the received data packet and the switch are located in the same network, it is considered that the failure of flow table matching is due to a lack of a flow table for the current network segment. In this case, the switch sends information about the data packet to a controller, that is, performs step 310; then the controller performs further parsing to provide a corresponding flow table, so that the switch performs an action such as forwarding the data packet or discarding the data packet.

At step 312, after receiving the information about the data packet for which the flow table matching fails, the controller determines whether there is a virtual machine corresponding to the destination IP address of the data packet.

If it is determined at step 312 that there is a virtual machine corresponding to the destination IP address of the data packet, the controller delivers a flow table used for forwarding the data packet to the switch, and the switch continues to forward the data packet, that is, step 314 and step 316 are performed.

If it is determined at step 312 that there is no virtual machine corresponding to the destination IP address of the data packet, the controller records the number of data packets that do not match a flow table and that are sent to the controller for further parsing, that is, perform step 318.

At step 320, the controller further determines whether the recorded number of data packets that do not match a flow table and that are sent to the controller for further parsing (that is, fails to hit a flow table) exceeds a threshold.

If the number of data packets that fail to hit a flow table as recorded per second at step 320 does not exceed the threshold, the data packet continues to be forwarded, that is, step 314 and step 316 are performed.

If the number of data packets that fail to hit a flow table as recorded per second at step 320 exceeds the threshold, it is considered a malicious network attack, and accordingly a flow table that has a predetermined valid time period and that is used for barring the current virtual machine from sending data is added, that is, step 322 is performed, so as to bar the virtual machine.

In some optional implementations, the above-mentioned threshold is preferably 15 times per second.

At step 324, it is determined whether the flow table used for barring forwarding of the data packet has expired. if no, the current virtual machine is barred from sending data; if yes, the flow table used for barring forwarding of the data packet becomes invalid, that is, the barring is removed, and the virtual machine resends a data packet. However, if the new data packet sent by the virtual machine still has the above-mentioned attack behavior, the virtual machine will be barred again for a period of time.

As can be seen from FIG. 3 and the above descriptions, compared with the embodiment shown in FIG. 2, this embodiment not only implements data forwarding, but also provides a method for dealing with failure of flow table matching, thus providing a method for establishing a virtual network communication link that has an automatic repair function.

The method shown in FIG. 3 is described below through specific embodiments involving two cases of failure of flow table matching with reference to FIG. 4 and FIG. 5.

Figure 4:
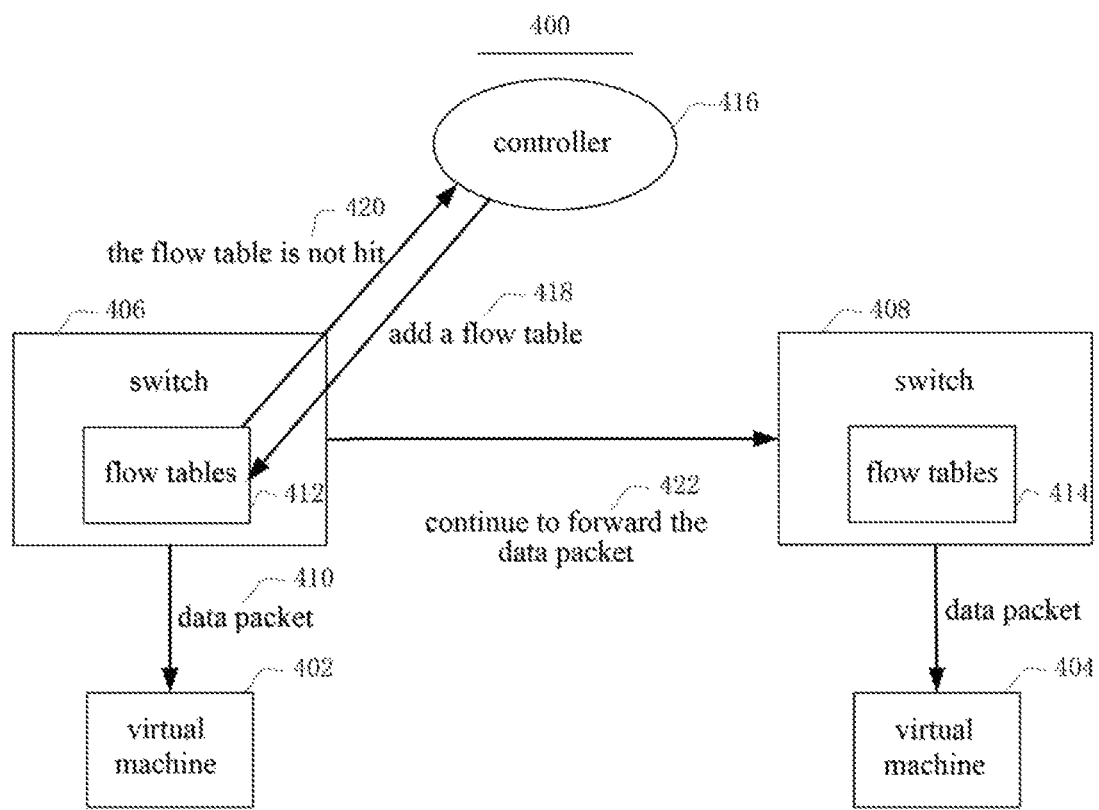
FIG. 4 illustrates a packet forwarding flow in the case of failure of flow table matching at a sending end when sending data according to an embodiment of the present invention.

FIG. 4 illustrates a packet forwarding flow in the case of failure of flow table matching at a sending end when sending data according to an embodiment of the present invention. In FIG. 4, virtual machines 402 and 404 communicate with switches 406 and 408 by sending data packets 410 to each other. Flow tables 412 and 414 are set in the switches 406 and 408. The controller 416 may communicate with the switches 406 and 408 by adding a flow table 418.

The packet forwarding flow 400 in FIG. 4 specifically includes the following steps. The virtual machine 402 at the sending end sends a data packet 410 to the switch 406. The switch 406 matches a flow table of the received data packet 410 with the flow table 412 that is set therein. When the switch 406 determines that the received data packet 410 needs to be parsed by the controller 416, for example, when the switch 406 determines that the flow table is not hit 420, and a destination IP address of the data packet 410 and the switch are located in the same network 406, the switch 406 sends information about the received data packet to the controller 416. When the controller 416 determines, through parsing, that the data packet 410 can be forwarded, for example, when there is no virtual machine 404 corresponding to the destination IP address of the data packet 410, or for example, when there is a virtual machine 404 corresponding to the destination IP address of the data packet 410 and the number of data packets that fail to hit the flow table 420 as recorded per second does not exceed a threshold, the controller 416 performs an action 418 of adding a flow table to the switch 406, and thus performs an action 422 of continuing to forward the data packet 410. The switch 408 at the receiving end sends the received data packet 410 to the virtual machine 404 at the receiving end by using the flow table 414 that is set therein, thus completing the data forwarding.

For a virtual machine, failure of flow table matching not only may occur during data sending, but also may occur during data receiving. Because the flow table of the receiving direction is generated according to local information, theoretically it will not be lost. Even if there is a message loss or failure in requesting a server, an automatic retry will be performed. Therefore, in this case, the failure of flow table matching is due to that the data packet is forwarded to an incorrect place according to the flow table of the sending end, and what needs to be repaired is the flow table of the sending end.

Figure 5:
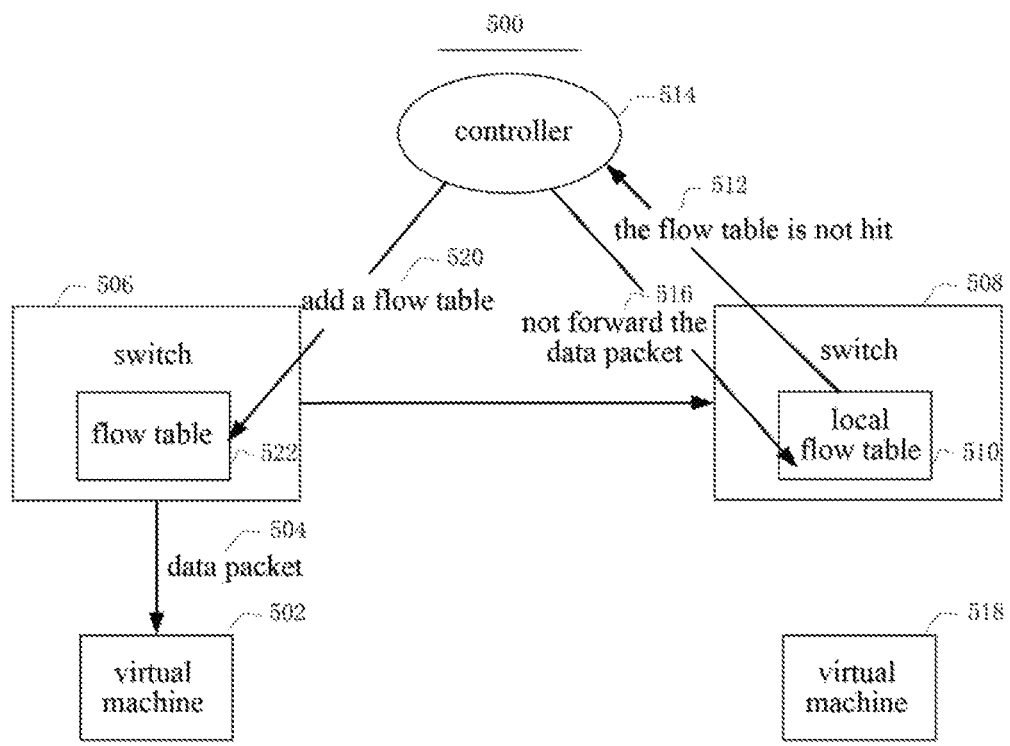
FIG. 5 illustrates a packet forwarding flow in the case of failure of flow table matching at a sending end when receiving data according to an embodiment of the present invention.

Accordingly, referring to FIG. 5, a packet forwarding flow in the case of failure of flow table matching at a sending end when receiving data according to an embodiment of the present invention is illustrated. The devices and the connection relationship thereof in FIG. 5 are similar to those in FIG. 4, and will not be repeatedly described here.

The packet forwarding flow 500 in FIG. 5 includes the following steps. A data packet 504 sent from a virtual machine 502 at the sending end is sent to a switch 508 at the receiving end through a switch 506 at the sending end. The switch 508 matches a flow table of the received data packet 504 with a local flow table 510, and sends information about the data packet to a controller 514 after determining that the flow table is not hit 512. The controller 514 delivers, to the switch 508 according to the source information about the data packet 504, a flow table used for barring forwarding 516 of the data packet 504, so that the switch 508 does not forward the data packet 504 to a virtual machine 518 at the receiving end. Meanwhile, the controller 514 adds a flow table 520 to the switch 506 at the sending end, thus repairing a flow table 522 at the sending end.

The specific embodiments shown in FIG. 4 and FIG. 5 further show the automatic repair function of the method for establishing a virtual network communication link as shown in FIG. 3 in the case of failure of flow table matching. The automatic repair function can improve the disaster tolerance capability of the communication link.

According to another aspect, the present application further provides a switch for communication in an SDN virtual network.

Figure 6:
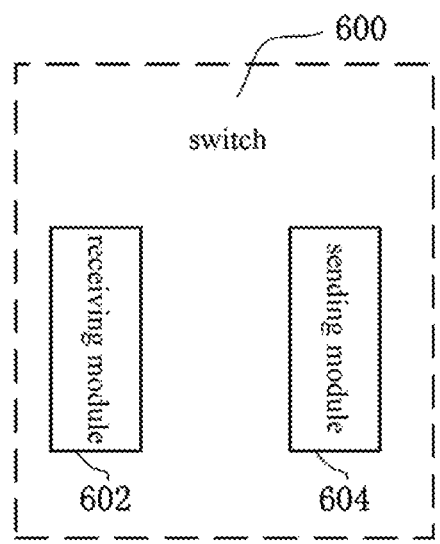
FIG. 6 is a logical structural diagram of a switch according to an embodiment of the present invention.

FIG. 6 is a logical structural diagram of a switch according to an embodiment of the present invention. The switch 600 includes: a receiving module 602, configured to determine whether a flow table of a received data packet can be detected in a local flow table of the switch 600; and a sending module 604, configured to send the data packet according to a flow table that is generated based on information about the data packet.

Specifically, the receiving module 602 receives a data packet sent from a virtual machine, and then matches a flow table of the received data packet with a local flow table of the switch 600, to determine whether the data packet can hit a flow table, that is, whether a flow table is detected. The sending module 604 forwards the data packet when the receiving module 602 determines that the matching of the flow table of the data packet is successful.

In some optional implementations, the receiving module 602 is further configured to determine whether a destination IP address of the data packet and the switch are located in the same network, when it is determined that no flow table is detected for the data packet. If the receiving module 602 determines that the matching of the flow table of the data packet fails, and determines that the destination IP address of the data packet and the switch 600 are located in the same network, the sending module 604 sends the information about the data packet to a controller; if the receiving module 602 determines that the matching of the flow table of the data packet fails, and determines that the destination IP address of the data packet is not located in a same network as the switch 600, the sending module 604 forwards the data packet to a gateway according to a flow table delivered by the controller.

In some optional implementations, the sending module 604 is further configured to suspend data forwarding to a virtual machine according to a flow table delivered by a controller. Specifically, when the controller delivers, to the switch 600 after further parsing, a flow table that has a predetermined valid time period and that is used for barring the switch from forwarding data, the sending module 604 suspends data forwarding to the virtual machine and remove the barring after the predetermined valid time period, so that the virtual machine cannot forward data within the predetermined time period.

According to still another aspect, the present application further provides a controller for communication in an SDN virtual network.

Figure 7:
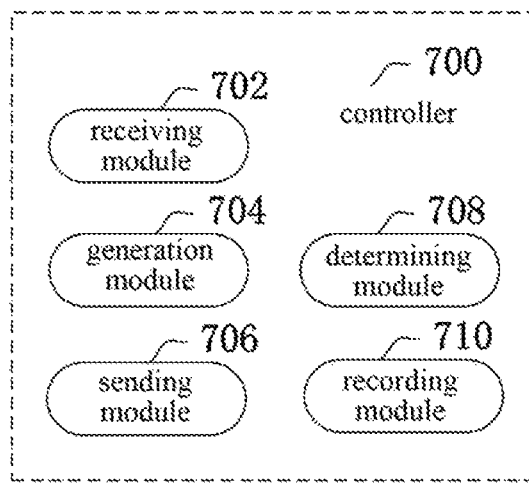
FIG. 7 is a logical structural diagram of a controller according to an embodiment of the present invention.

FIG. 7 is a logical structural diagram of a controller according to an embodiment of the present invention. The controller 700 includes: a receiving module 702, configured to receive, from a switch, information about a data packet for which no flow table is detected; a generation module 704, configured to generate a corresponding flow table according to a forwarding rule of the controller or a determining result of the switch; and a sending module 706, configured to deliver the flow table generated by the generation module to the switch.

In some optional implementations, the controller 700 further includes a determining module 708, configured to determine whether there is a virtual machine corresponding to a destination IP address of the data packet and perform a threshold comparison and an expiration judgment, so as to determine the forwarding rule for the data packet according to the determining result.

In some optional implementations, the controller 700 further includes a recording module 710, configured to record the number of data packets for which flow table matching fails and that are sent to the controller, when the determining module 708 determines that there is no virtual machine corresponding to the destination IP address of the data packet.

In some optional implementations, the generation module 704 is further configured to add a flow table that has a valid time period and that is used for barring a virtual machine from forwarding data, when the determining module 708 determines that the number of data packets that fails to hit a flow table as recorded per second exceeds a threshold. As described above, the threshold may preferably be 15 times per second.

In some optional implementations, the flow table used for barring a virtual machine from forwarding data that is generated by the generation module 704 has a predetermined valid time period. When the predetermined valid time period of the barring action has expired, the virtual machine is permitted to resend a data packet.

It should be noted that, as used in the present application, the expressions such as "a flow table is detected", "flow table matching is successful", "hit a flow table" and the like have the same meaning; the expressions such as "no flow table is detected", "flow table matching fails", "fail to hit a flow table" and the like have the same meaning; and the expressions such as "barring action becomes invalid", "remove the barring" and the like have the same meaning; and the expressions such as "not forward", "bar forwarding" and the like have the same meaning.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for communication in a virtual network, comprising:

receiving, by a switch, a data packet;
determining, by the switch, that no flow table of the data packet is detected;
determining, by the switch, whether a destination IP address of the data packet and the switch are in a same network;
in response to a determination that the destination IP address of the data packet and the switch are located in the same network:
  sending, by the switch, information about the data packet to a controller, the information about the data packet comprising the destination IP address of the data packet;
  in response to the controller determining that no virtual machine corresponds to the destination IP address of the data packet and that a number of data packets that do not match a first flow table does not exceed a threshold:
    receiving, by the switch, the first flow table for forwarding the data packet; and
    forwarding, by the switch, the data packet based on the first flow table;
  in response to the controller determining that no virtual machine corresponds to the destination IP address of the data packet and that the number of data packets that do not match the first flow table exceeds the threshold:
    receiving, by the switch, a second flow table for barring forwarding of the data packet.

2. The method according to claim 1, further comprising:
in response to a determination that the destination IP address of the data packet and the switch are not located in the same network:
  receiving, by the switch and from the controller, a third flow table used for sending the data packet to a gateway; and
  sending, by the switch, the data packet to the gateway based on the third flow table.

3. The method according to claim 1, further comprising:
determining whether the destination IP address of the data packet and the switch are located in the same network by determining whether the destination IP address of the data packet is located in classless inter-domain routing of a subnet of the switch.

4. The method according to claim 1, further comprising:
in response to the controller determining that a virtual machine corresponding to the destination IP address of the data packet exists:
  receiving, by the switch, the first flow table for forwarding the data packet; and
  forwarding, by the switch, the data packet based on the first flow table.

5. The method according to claim 1, wherein the threshold is 15 times per second.

6. The method according to claim 1, wherein the second flow table for barring the switch from forwarding the data packet has a predetermined valid time period.

7. A switch for communication in a virtual network, comprising:
a receiving module, configured to:
  receive a data packet:
  determine whether a flow table of the data packet is detected in a local flow table of the switch;
  determine whether a destination IP address of the data packet and the switch are in a same network; and
  in response to a determination that the destination IP address of the data packet and the switch are located in the same network, send information about the data packet to a controller to cause the controller to determine whether a virtual machine corresponding to the destination IP address of the data packet exists; and
a sending module, configured to:
  send the data packet according to a first flow table generated based on the information about the data packet in response to the controller determining that no virtual machine exists for the destination IP address of the data packet and that a number of data packets that do not match the first flow table does not exceed a threshold; and
  suspend sending the data according to a second flow table generated based on the information about the data packet in response to the controller determining that no virtual machine exists for the destination IP address of the data packet and that the number of data packets that do not match the first flow table exceeds the threshold.

8. A controller for a virtual network, comprising:
a receiving module, configured to receive, from a switch, information about a data packet indicating no flow table being detected;
a determining module, configured to:
  determine whether a virtual machine exists for a destination IP address of the data packet based on the information; and
  determine whether a number of data packets that do not match the flow table exceeds a threshold;
a generation module, configured to:
  generate a first flow table for the switch to forward the data packet in response to determining that no virtual machine exists for the destination IP address of the data packet and that a number of data packets that do not match the flow table does not exceed the threshold; and
  generate a second flow table for the switch to bar forwarding the data packet in response to determining that no virtual machine exists for the destination IP address of the data packet and that the number of data packets that do not match the flow table exceeds the threshold;
a sending module, configured to deliver the first or second flow table generated by the generation module to the switch; and
a recording module, configured to record the number of data packets sent to the controller and indicating no flow table being detected, in response to that no virtual machine corresponding to the destination IP address of the data packet exists.

9. The controller according to claim 8, wherein the second flow table, which is generated by the generation module, for barring the switch from forwarding data has a predetermined valid time period.

10. A device, comprising:
a processor; and
a memory storing a local flow table and computer readable instructions executable by the processor, the computer readable instructions when executed by the processor, causing the processor to:
  receive a data packet:
  determine whether a flow table of the data packet is detected in the local flow table;
  determine whether a destination IP address of the data packet and the switch are in a same network;
  in response to a determination that the destination IP address of the data packet and the switch are located in the same network, send information about the data packet to a controller to cause the controller to determine whether a virtual machine corresponding to the destination IP address of the data packet exists;

send the data packet according to a first flow table generated based on the information about the data packet, the information about the data packet comprising a destination IP address of the data packet in response to the controller determining that no virtual machine exists for the destination IP address of the data packet and that a number of data packets that do not match the first flow table does not exceed a threshold; and suspend sending the data according to a second flow table generated based on the information about the data packet in response to the controller determining that no virtual machine exists for the destination IP address of the data packet and that the number of data packets that do not match the first flow table exceeds the threshold.

11. A device, comprising:

a processor; and a memory storing a forwarding rule for the processor and computer readable instructions executable by the processor, the computer readable instructions when executed by the processor, causing the processor to:

receive, from a switch, information about a data packet indicating no flow table being detected;

determine whether a virtual machine exists for a destination IP address of the data packet based on the information; and determine whether a number of data packets that do not match the flow table exceeds a threshold;

generate a first flow table for the switch to forward the data packet in response to determining that no virtual machine exists for the destination IP address of the data packet and that a number of data packets that do not match the flow table does not exceed the threshold;

generate a second flow table for the switch to bar forwarding the data packet in response to determining that no virtual machine exists for the destination IP address of the data packet and that the number of data packets that do not match the flow table exceeds the threshold;

deliver the first or a second generated flow table to the switch; and record the number of data packets sent to the controller and indicating no flow table being detected, in response to determining that no virtual machine corresponding to the destination IP address of the data packet exists.

12. A non-transitory computer storage medium storing a local flow table and computer readable instructions executable by a processor, the computer readable instructions when executed by the processor, causing the processor to:

receive a data packet;

determine whether a flow table of the data packet is detected in the local flow table;

determine whether a destination IP address of the data packet and the switch are in a same network;

in response to a determination that the destination IP address of the data packet and the switch are located in the same network, send information about the data packet to a controller to cause the controller to determine whether a virtual machine corresponding to the destination IP address of the data packet exists;

send the data packet according to a first flow table generated based on the information about the data packet, the information about the data packet comprising a destination IP address of the data packet in response to the controller determining that no virtual machine exists for the destination IP address of the data packet and that a number of data packets that do not match the first flow table does not exceed a threshold; and suspend sending the data according to a second flow table generated based on the information about the data packet in response to the controller determining that no virtual machine exists for the destination IP address of the data packet and that the number of data packets that do not match the first flow table exceeds the threshold.

13. A non-transitory computer storage medium storing a forwarding rule for a processor and computer readable instructions executable by the processor, the computer readable instructions when executed by the processor, causing the processor to:

receive, from a switch, information about a data packet indicating no flow table being detected;

determine whether a virtual machine exists for a destination IP address of the data packet based on the information;

determine whether a number of data packets that do not match the flow table exceeds a threshold;

generate a first flow table for the switch to forward the data packet in response to determining that no virtual machine exists for the destination IP address of the data packet and that a number of data packets that do not match the flow table does not exceed the threshold;

generate a second flow table for the switch to bar forwarding the data packet in response to determining that no virtual machine exists for the destination IP address of the data packet and that the number of data packets that do not match the flow table exceeds the threshold;

deliver the first or second generated flow table to the switch; and record the number of data packets sent to the controller and indicating no flow table being detected, in response to determining that no virtual machine corresponding to the destination IP address of the data packet exists.

* * * * *

UNITED STATES PATENT AND TRADEMARK OFFICE
CERTIFICATE OF CORRECTION

PATENT NO. : 10,680,930 B2
APPLICATION NO. : 15/534395
DATED : June 9, 2020
INVENTOR(S) : Yi Yang et al.

It is certified that error appears in the above-identified patent and that said Letters Patent is hereby corrected as shown below:

In the Claims

Column 11, Claim 11, Line 46:
"deliver the first or a second generated" should be: --deliver the first or second generated--.

Signed and Sealed this
Eighth Day of December, 2020

Andrei Iancu
*Director of the United States Patent and Trademark Office*